United States Patent
Jodh et al.

(10) Patent No.: US 7,600,024 B2
(45) Date of Patent: Oct. 6, 2009

(54) RESTRICTING DEVICE ACCESS PER SESSION

(75) Inventors: Santosh Sharad Jodh, Sammamish, WA (US); Sriram Sampath, Bellevue, WA (US); James George Cavalaris, Kirkland, WA (US); Ara Bernardi, Mercer Island, WA (US); Narayanan Ganapathy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 545 days.

(21) Appl. No.: 11/396,191

(22) Filed: Mar. 31, 2006

(65) Prior Publication Data

US 2007/0233869 A1    Oct. 4, 2007

(51) Int. Cl.
  *G06F 15/173* (2006.01)
  *G06F 15/16* (2006.01)
(52) U.S. Cl. .................... 709/226; 709/203; 709/219
(58) Field of Classification Search ............... 709/203, 709/227–229, 219, 226
  See application file for complete search history.

(56) References Cited

U.S. PATENT DOCUMENTS

| | | | |
|---|---|---|---|
| 6,085,247 A * | 7/2000 | Parsons et al. .............. 709/227 |
| 6,457,069 B1 | 9/2002 | Stanley |
| 6,466,982 B1 * | 10/2002 | Ruberg ....................... 709/227 |
| 6,725,281 B1 | 4/2004 | Zintel et al. |
| 6,895,588 B1 * | 5/2005 | Ruberg ....................... 719/321 |
| 6,970,751 B2 | 11/2005 | Gonzales et al. |
| 2003/0084165 A1 | 5/2003 | Kjellberg et al. |
| 2004/0128412 A1 * | 7/2004 | Harrison ...................... 710/33 |
| 2004/0243892 A1 | 12/2004 | McBride et al. |
| 2005/0005013 A1 | 1/2005 | Saint-Hilaire et al. |
| 2005/0102369 A1 | 5/2005 | Kim et al. |
| 2005/0138179 A1 | 6/2005 | Encarnacion et al. |
| 2005/0138193 A1 | 6/2005 | Encarnacion et al. |
| 2006/0265386 A1 * | 11/2006 | Richter ........................ 707/10 |
| 2007/0061477 A1 * | 3/2007 | Stoyanov et al. ............ 709/230 |

FOREIGN PATENT DOCUMENTS

WO    WO 2005/103914 A1    11/2005

OTHER PUBLICATIONS

Simone Leggio, Jukka Manner, Antti Hulkkonen, Kimmo Raatikainen "Session Initiation Protocol Deployment in Ad-Hoc Networks: a Decentralized Approach", 6 pages http://www.tml.tkk.fi/Research/SESSI/Publications/iwwan.pdf.

Yoshihiro Kawahara, Masateru Minami, Shunsuke Saruwatari, Hiroyuki Morikawa, and Tomonori Aoyama "Challenges and Lessons Learned in Building a Practical Smart Space", 10 pages Proceedings of the First Annual International Conference on Mobile and Ubiquitous Systems: networking and Services (MobiQuitous'04) IEEE 2004 http://ieeexplore.ieee.org/search/wrapper.jsp?arnumber=1331728.

Károly Farkas, Bernhard Plattner "Siramon: Service Provisioning Framework for Self-Organized Networks", 8 pages Eidgenössische Technische Hochschule Zürich Swiss Federal Institute of Technology Zurich May 12, 2004 http://www.tik.ee.ethz.ch/~farkas/publications/Siramon-research_proposal.pdf.

* cited by examiner

*Primary Examiner*—George C Neurauter, Jr.
(74) *Attorney, Agent, or Firm*—Workman Nydegger (57) ABSTRACT

The present invention is directed to restricting device access per session. Entries in a device list are configured to store session ID values in addition to values for other device properties. A session ID value for a device can be set to the session ID value of a (e.g., RDP) session that registered the device such that the subsequent transfer of device related information for the device can be restricted to processes in the session. When a request for device related information is received from a process, an access check is performed by at least comparing a session ID value for the process to a session ID value stored in a device entry for the device. When the access check is successful, for example, when session ID values match, access to the requested device related information can be permitted.

17 Claims, 5 Drawing Sheets

RESTRICTING DEVICE ACCESS PER SESSION

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, Web browsing, and printing documents) include the communication (e.g., the exchange of electronic messages) between a number of computer systems and/or other electronic devices via wired and/or wireless computer networks.

A computer system typically includes at least a processor and system memory used to execute programs. In many environments, computer systems also have multiple peripheral devices used to perform different computer related tasks. For example, a computer system can have one or more of a keyboard, a mouse, a disk drive, a video card, a display device, a printer, a network card, etc. A computer system can also be coupled to other computing devices to facilitate computing tasks. For example, a computer system can be couple to a Personal Digital Assistant ("PDA") to synchronize data.

Peripheral and computing devices device can be attached internally and/or externally to a computer system. For example, a magnetic hard drive may be attached inside the case of a computer system and a printer attached outside the case of the computer system. Some peripheral and computing devices may be attached to a computer system for a relatively long period of time. For example, a video card may remain coupled to a computer system for essentially the life time of the computer system (or until it is upgraded with a more advanced video card). Other peripheral and computing devices may be attached to a computer system for a relatively short period of time. For example, a Universal Serial Bus ("USB") thumb drive may be coupled to a computer system only long enough to transfer a file and then is decoupled from the computer system.

In some environments, the same peripheral or computing device is attached and removed from a computer system many times. For example, a Personal Digital Assistant ("PDA") can be coupled to a computer system to synchronize data each time a sales person returns to the office from a sales trip and then decoupled from the computer system when the sales person begins a new sales trip. In other cases, for example, when a peripheral device is upgraded, a current peripheral device (e.g., an older video card) is decoupled from a computer system and a replacement peripheral device (e.g., a newer video card) is coupled to the computer system. In these other cases, the current peripheral device is often discarded or retained as a backup in case the replacement peripheral device malfunctions Accordingly, over the life span of a computer system the peripheral and computing devices attached to a computer system can change. Some may change quite frequently, some only intermittently, and some perhaps only once.

For peripheral and computing devices to work correctly at a computer system the computer system must have access to appropriate software, such as, for example, applications and device drivers. In some environments, appropriate software is loaded manually through an installation program. In other environments, computerized installation mechanisms, such as, for example, Plug and Play ("PnP"), at least partially automate the installation process at the computer system.

Some computer systems may be coupled to multiple instances of a particular peripheral device, such as, for example, to multiple keyboards, printers, monitors, etc. In these environments, processing may occur through a single session. For example, multiple monitors can be used to display data for a single user of a home computer system.

In other computing environments, entities also use terminal servers to provide remote access to applications and data. A terminal server is a computer system that maintains applications that can be remotely executed by client computer systems. Input is entered at a client computer system and transferred over a network (e.g., using protocols based on the ITU T.120 family of protocols, such as, for example, Remote Desktop Protocol ("RDP")) to an application at the terminal server. The application processes the input as if the input was entered at the terminal server. The application generates output in response to the received input and the output is transferred over the network (e.g., also T.120 based protocols) to the client computer system. The client computer system presents the output data. Thus, input is received and output presented at the client computer system, while processing actually occurs at the terminal server.

In most, if not all terminal server environments, input data (entered at a client computer system) typically includes mouse and keyboard data representing commands to an application and output data (generated by an application at the terminal server) typically includes video data for display on a video output device. Many terminal server environments also include functionality that extended protocols (e.g., developed to transfer input and output data) to transfer other types of data.

For example, virtual channels can be used to extend the RDP protocol by allowing plug-ins to transfer data over an RDP connection. Many such extensions exist, facilitating mechanisms such as printer redirection, clipboard redirection, port redirection, etc., through the use of virtual channel technology. For example, a USB thumb drive connected to a client computer system can be redirected to the terminal server to simulate the USB thumb drive being connected directly to the terminal server.

Most terminal servers allow multiple sessions to connect to the terminal server to utilize the resources of the terminal server. Thus, in single system environment or a terminal server environment different sessions can simultaneously utilize available system resources. However, in both of these environments devices are typically globally available. That is, every connected and/or redirected device is visible to all processes across all sessions.

Thus, the enumeration and detection of connected and/or redirected devices is typically not secured. That is, a user connected through one session can list and detect devices connected and/or redirected through other sessions. For example, any session connected to a terminal server may be able to enumerate and detect devices redirected for all other sessions. Once a device is enumerated or detected by a process in another session, the other session can access the device and any associated data. This can be problematic when a user is utilizing a connected or redirected device for personal or otherwise sensitive data or prefers that their computing activities remain private.

BRIEF SUMMARY

The present invention extends to methods, systems, and computer program products for restricting device access per session. In some embodiments, a session establishment request is received from computing components coupled to a computer system. The session establishment request requests establishment of a session to access a portion of the shared resources of the computer system. A session is established between the computer system and the computing components to allow the computing components to access the portion of shared resources. A session identifier is assigned to the established session to differentiate the established session from other sessions of the computer system.

A device registration request to register a device for use with an established session is received. Appropriate software is accessed to permit the computer system to interface with the device in response to the registration request. A device entry is created for the device. The device entry is configured to store values for properties of the device. The value of a session identifier property in the device entry is set to the session identifier for the established session such that the subsequent transfer of device related information for the device can be restricted to processes in the established session. The device entry is stored in a device list accessible to a module that performs access checks to determine appropriate responses to requests for device related information.

In other embodiments, a request for device related information for a device is received from a requesting process in a requesting session. The requesting session has a corresponding requesting session identifier. A device session identifier for the device is accessed from a device list that lists devices connected to the computer system. The device session identifier is the session identifier of the session that the device is bound to. An access check is performed to determine if the requesting process is permitted to access the device related information for the device by at least comparing the requesting session identifier to the device session identifier. An appropriate response to the requesting process is formulated based on the results of the access check.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for restricting device access per session. In some embodiments, a session establishment request is received from computing components coupled to a computer system. The session establishment request requests establishment of a session to access a portion of the shared resources of the computer system. A session is established between the computer system and the computing components to allow the computing components to access the portion of shared resources. A session identifier is assigned to the established session to differentiate the established session from other sessions of the computer system.

A device registration request to register a device for use with an established session is received. Appropriate software is accessed to permit the computer system to interface with the device in response to the registration request. A device entry is created for the device. The device entry is configured to store values for properties of the device. The value of a session identifier property in the device entry is set to the session identifier for the established session such that the subsequent transfer of device related information for the device can be restricted to processes in the established session. The device entry is stored in a device list accessible to a module that performs access checks to determine appropriate responses to requests for device related information.

In other embodiments, a request for device related information for a device is received from a requesting process in a requesting session. The requesting session has a corresponding requesting session identifier. A device session identifier for the device is accessed from a device list that lists devices connected to the computer system. The device session identifier is the session identifier of the session that the device is bound to. An access check is performed to determine if the requesting process is permitted to access the device related information for the device by at least comparing the requesting session identifier to the device session identifier. An appropriate response to the requesting process is formulated based on the results of the access check.

Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise computer-readable storage media, such as, RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer, the computer properly views the connection as a computer-readable medium. Thus, by way of example, and not limitation, computer-readable media can comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

In this description and in the following claims a terminal server protocol is defined as any protocol based on or that extends the ITU T.120 family of protocols, such as, for example, Remote Desktop Protocol ("RDP")).

Figure 1A:
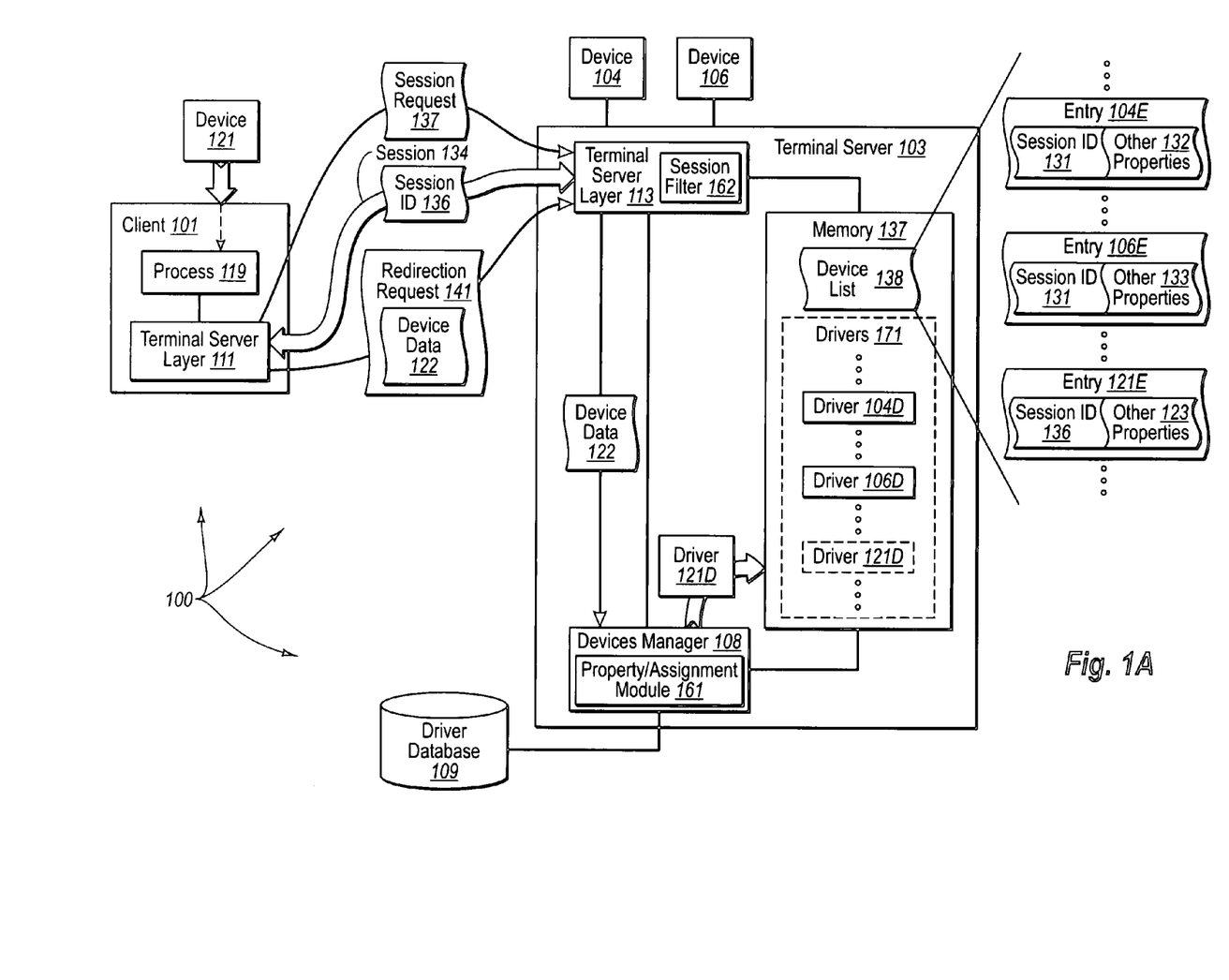
FIG. 1A illustrates an example computer architecture that facilitates restricting device access per session.

FIG. 1A illustrates an example computer architecture 100 that facilitates restricting device access per session. Computer architecture 100 includes client 101 and terminal server 103. Each of client 101 and terminal server can be connected to network 121, such as, for example, a Local Area Network ("LAN"), a Wide Area Network ("WAN"), or even the Internet. Thus, the various components at client 101 and terminal server 103 can receive data from and send data to each other, as well as other components connected to the network. Accordingly, the components can create message related data and exchange message related data (e.g., Internet Protocol ("IP") datagrams and other higher layer protocols that utilize IP datagrams, such as, Transmission Control Protocol ("TCP"), Remote Desktop Protocol ("RDP"), Hypertext Transfer Protocol ("HTTP"), Simple Mail Transfer Protocol ("SMTP"), etc.) over the network.

Generally, client 101 can be a computer system in communication with terminal server 103 for remote execution of applications at terminal server 103. Thus, input data (e.g., mouse and keyboard input) representing application commands can be received at client component of client 101 and transferred over network to terminal server 103.

Terminal server 103 then supplies the input data to the appropriate application at the server instance. The application generates output data, for example, display data, in response to the input data. The output display data can then transferred over the network to client 101. Client 101 can then display the display data at a display device. Thus, input is received and output presented at the client 101, while processing actually occurs at terminal server 103.

Client 101 can include plug-ins that communicate with applications at terminal server 103 over virtual channels. Data transferred between plug-ins and corresponding applications can be exchanged over virtual channels similarly to the exchange of input and output data. A plug-in can send client data to an application and the application can return server data (e.g., results of processing the client data) back to the plug-in. Communication between a plug-in and a corresponding application can facilitate features such as printer redirection, clipboard redirection, port redirection, transfer of multimedia streams, transfer of Universal Serial Bus ("USB") data, etc. Thus, it may be that data, in addition to input data and output display data, is exchanged over one or more virtual channels of a terminal server connection.

At client 101, client side data (input data, plug-in data, etc.) for transfer to terminal server 103 passes down through the components of a communication stack that includes process 119 (e.g., a client side terminal server component), terminal server layer 111, and other lower layer protocols. Thus, client side data can be received at process 119, passed down to terminal server layer 111, and then transferred over a network.

Terminal server 103 can receive client side data and perform essentially the inverse of the operations that were performed at client 101. That is, received client data can be passed up through the lower layer components of a communication stack, received at terminal server layer 113, and then passed up to an appropriate process (e.g., a server side terminal server component).

When an application processes client side data, it may in turn generate server side data to return back to client 101. Server side data can be sent from terminal server 103 back to client 101 in a manner similar to client 101 sending client side data to terminal server 103. Client 101 can process received server side data similar to terminal server 103 processing client side data.

Terminal server 103 includes devices manager 108 that manages device drivers for devices connected and redirected to terminal server 103. When a new device (e.g., printer, monitor, keyboard, storage device, etc) is detected, devices manager 108 scans driver database 109 to attempt to identify an appropriate device driver for the new device. Devices manager 108 can load device drivers into and remove devices drivers from memory 137 as the arrival and departure of devices is detected. Devices manager 108 can utilize automated mechanisms, such as, for example, Plug and Play ("PnP"), to assist terminal server 103 in recognizing and adapting to hardware configuration changes.

Devices manager 108 can maintain device list 138 for devices connected to and redirected to terminal server 103. When a new device is detected, property assignment module 161 can record values for various device properties in a corresponding entry for the new device. The entry can then be stored in device list 138.

In some embodiments, device list 138 has a hierarchical tree format. Devices manager 108 alters the tree as devices are detected using device data, data from appropriate drivers, and other components. Each entry in the tree can be a device node that includes device objects for the device's drivers and other information maintained by devices manager 108. Device nodes lower in the tree can be viewed as child nodes to device nodes higher in the tree.

Before data is transferred between client 101 and terminal server 103 a session can be established. Terminal server layer 111 can send a session request to terminal server layer 113. Terminal server layer 113 can receive the session request. Through various terminal server protocols, a session between terminal server layer 111 and terminal server layer 113 can be established. The established session can be assigned a (potentially unique) session identifier to differentiate the session from other sessions client 101 and/or terminal server 103 participate in.

Figure 2:
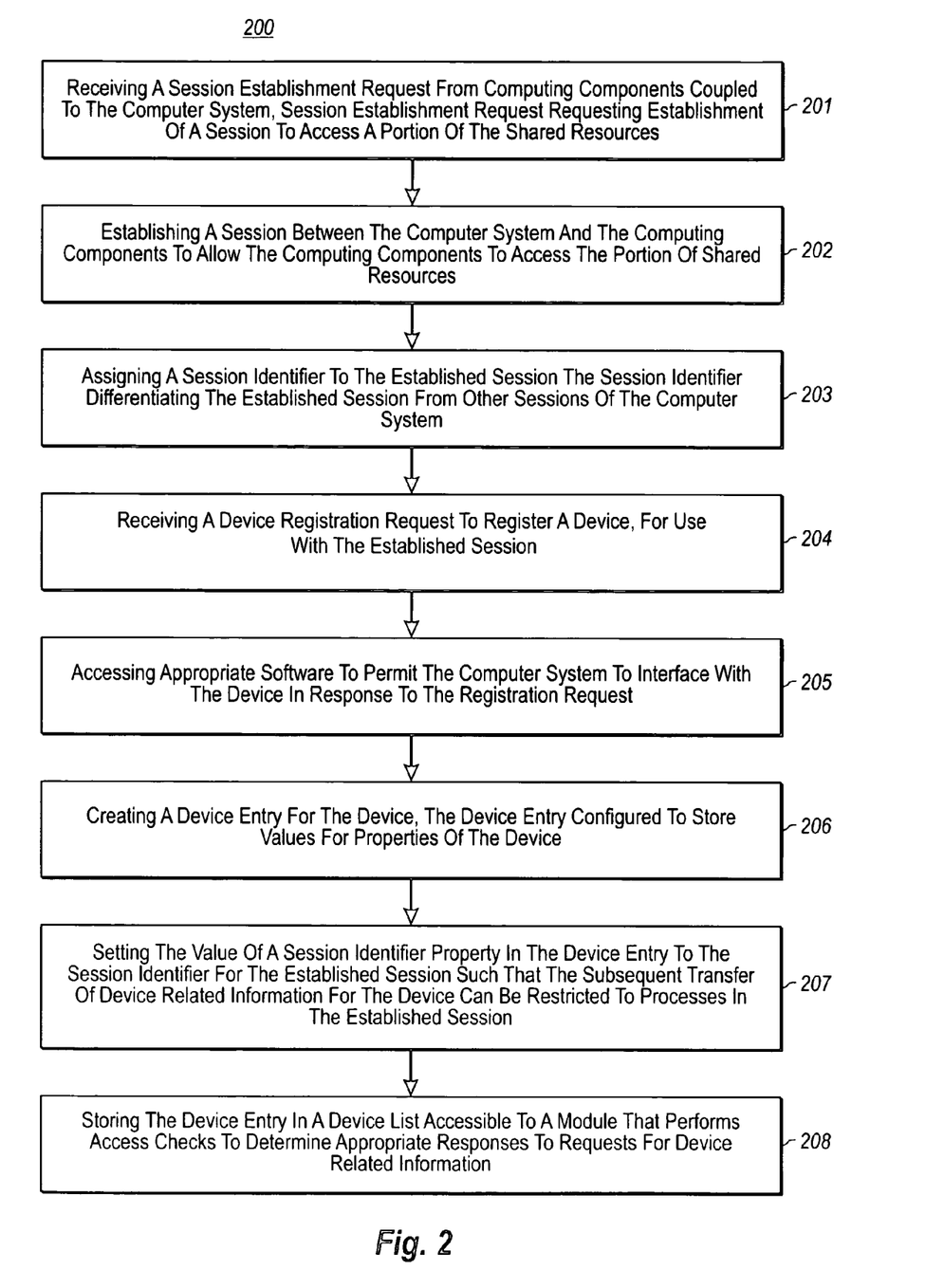
FIG. 2 illustrates a flow chart of an example method for tagging a device to indicate the device corresponds to a specified session.

FIG. 2 illustrates a flow chart of an example method 200 for tagging a device to indicate the device corresponds to a specified session. The method 200 will be described with respect to the components and data depicted in FIG. 1A.

Method 200 includes an act receiving a session establishment request from computing components coupled to the computer system (act 201). The session establishment request requests establishment of a session to access a portion of the shared resources of the computer system. For example, terminal server layer 113 can receive session request 137 from terminal server layer 111. Session request 137 can be a request to establish an RDP session between terminal server layer 111 and terminal server layer 113 so that client 101 can utilize resources of terminal server 103.

Method 200 includes an act of establishing a session between the computer system and the computing components to allow the computing components to access the portion of shared resources (act 202). For example, through various terminal server protocols (e.g., RDP), terminal server layer 111 and terminal server layer 113 can establish session 134 (e.g., an RDP session).

Method 200 includes an act of assigning a session identifier to the established session the session identifier differentiating the established session from other sessions of the computer system (act 203). For example, terminal server 103 (potential as part of session establishment) can assign session ID 136 to session 134. Session ID 136 can be a unique ID used to distinguish session 134 from other sessions terminal server 103 participates in.

Method 200 includes an act of receiving a device registration request to register a device for use with an established session (act 204). The device registration request can be received from a process associated with the established session. For example, terminal server 103 can receive redirection request 141 from terminal server layer 111 (the module that manages terminal server communication for session 134). Redirection request 141 includes device data 122 indicating various properties of device 121.

Redirection request 141 can be a request to bind device 121 (e.g., a USB device) to session 134. Commands causing redirection request 141 to be sent may have originated at process 119 or at some higher level application. For example, upon plugging a USB device into a USB port, a user-interface may prompt a user for an indication if redirection to terminal server 103 is appropriate. If the user indication redirection, that indication can be passed down to process 119, then to terminal server layer 111, etc. A process that requests binding of a device to a session may also be bound to the session. Alternately, a process that requests binding of a device to a session may be management tool or service in a different session.

Method 200 includes an act of accessing appropriate software to permit the computer system to interface with the device in response to the registration request (act 205). For example, in response to receiving redirection request 141, terminal server layer 113 can forward device data 122 to devices manager 108. Devices manager 108 can utilize device data 122 to identify an appropriate driver for device 121 from driver database 109. Upon identifying an appropriate driver, devices manager 108 can load the driver into memory 137. For example, devices manager 108 can load driver 121D into memory 137 to permit terminal server 103 to interface with device 121.

Devices manager 108 can also load drivers for devices that are connected locally to terminal server 103. For example, device manager can identify and load drivers 104D and 106D into memory 137 upon detecting the presence of devices 104 and 106 respectively.

Alternately, client 101 can load a driver for device 101. In response to redirection request 141, terminal server 103 can redirect higher layer packets back to client 101 to pass commands to the driver loaded at client 101.

Method 200 includes an act of creating a device entry for the device (act 206). The device entry is configured to stores values for properties of the device. For example, devices manager 108 can create entry 121E configured to store values for properties of device 121. Properties can include, for example, a device identifier, a description, a manufacturer name, a section name, a device path, a session identifier, a hardware identifier, an installation result. Values for each of these properties, as well as other properties, can be stored in a device's device entry.

Through reference to received device data and driver data, property assignment module 161 can set values for properties of a device entry. For example, property assignment module 161 can set values for other properties 123 (e.g., a device identifier value, a description value, a manufacturer name value, a section name value, a hardware identifier value, an installation result value) based on device data 122 and data associated with driver 121D. Property assignment module 161 can also similarly set values for properties of device entries for devices locally connected terminal server 103. For example, property assignment module 161 can set values for any properties in other properties 123 (for device 104) and for any properties in other properties 133 (for device 106).

Method 200 includes an act of setting the value of a session identifier property in the device entry to the session identifier for the established session (act 207). For example, the session ID value for device 121 can be set to session ID 136. Entry 121E can store the session ID setting for device 121. Accordingly, when appropriate, subsequent transfer of any information from other properties 123 and accessing of data stored and/or associated with device 121 can be restricted to processes in session 134 (with potential exceptions for system sessions).

Locally connected devices can be assigned to a specified session ID (e.g., session 0) to indicate local connection to terminal server 103 through a system (and local) session. For example, within entries 104E and 106E, the value of the session identifier property can be set to session ID 131. Session ID 131 can be a specified value indicating a system (and local) session of terminal server 103 (e.g., for local administration of terminal server 103). Accordingly, when appropriate, subsequent transfer of any information from other properties 132 and 133 and accessing of data stored and/or associated with devices 104 and 106 can restricted to process in the system (and local) session.

In some embodiments, a process in a system session (e.g., session 0) assigns session ID values for other sessions. Alternately, a special management session (other than and potentially created by a system session) assigns session ID a values for other sessions.

Method 200 includes an act of storing the device entry in a device list accessible to a module that performs access checks to determine appropriate responses to requests for device related information (act 208). For example, devices manager 108 can store entry 121E (e.g., as a device node) in device list 138 (e.g., a device tree). Similarly, devices manager 108 can store entries 104E and 106E in device list 138. Device list 138 is accessible to session filter 162 that can perform access checks to determine appropriate responses to requests for device related information. Terminal server 103 may also include a second filter, or other module, for determining appropriate responses to requests for device related information for locally connected devices.

Figure 1B:
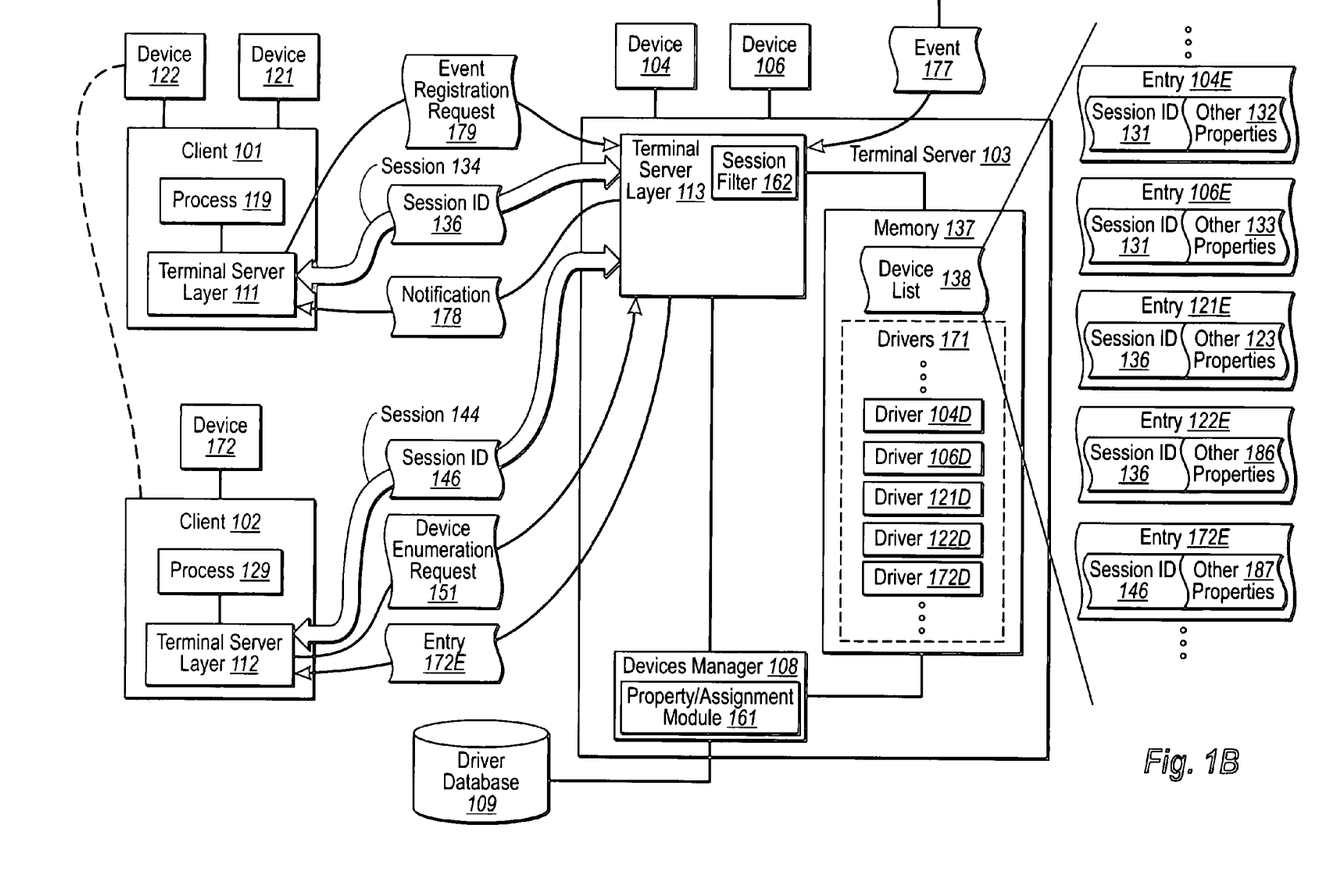
FIG. 1B illustrates another view of example computer architecture from FIG. 1A that facilitates restricting device access per session.

FIG. 1B illustrates another view of computer architecture 100 that facilitates restricting device access per session.

As depicted in FIG. 1B, device 122 has been connected to client 101. Device driver 122D has been loaded into memory 137 so that terminal server 103 can interface with device 122. Entry 122E, a device entry for device 132, has also been stored in device list 138 (e.g., as device node). Within entry 122E, the value of the session identifier property has been be set to session ID 136 (i.e., corresponding to session 134).

Client 102, including process 129 (e.g., a client component) and terminal server layer 112, is also depicted. Terminal server layer 112 and terminal server layer 113 have established session 144 (e.g., an RDP session). Session 144 has been assigned a session ID value of session ID 146. Session ID 146 can be a unique session ID such that session 144 can be distinguished from session 134 and other sessions that terminal server 103 participates in.

Device 172 has been connected to client 102. Device driver 172D has been loaded into memory 137 so that terminal server 103 can interface with device 172. Entry 172E, a device entry for device 172, has also been stored in device list 138 (e.g., as a device node). Within entry 172E, the value of the session identifier property has been be set to session ID 146 (i.e., corresponding to session 144)

In some embodiments, devices can also be bound to a plurality of sessions. For example, device 104 can be bound to both session 134 and session 146. Thus, processes in session 134 and 136 (as well as the system session) are permitted to enumerate and/or access device 104. As such, session ID 136 and session ID 146 can be included in entry 104E such that session ID 136 and session ID 146 can be matched during an access check.

A device at one client can also be bound to a plurality of sessions, including sessions at other clients. For example, device 122 can be bound to both session 136 and session 146. Thus, processes in session 134 and 136 (as well as the system session) are permitted to enumerate and/or access device 122. As such, session ID 146 can be included in entry 122E such that session ID 136 and session ID 146 can be matched during an access check.

Terminal server 103 can redirect higher layer packets between client 101 and client 102 to facilitate session 144's use of device 122. For example, packets can travel form terminal server layer 112, through terminal server layer 113, to terminal server layer 111 and then transferred to device 122 for processing. Any results from device 122 can be returned to client 102 in essentially a reverse path.

Terminal server 103 can control the establishment and tearing down of bindings between a device and a plurality of different sessions. Thus, a device can be bound to plurality of sessions (a 1-N relationship) in a controlled manner.

Figure 3:
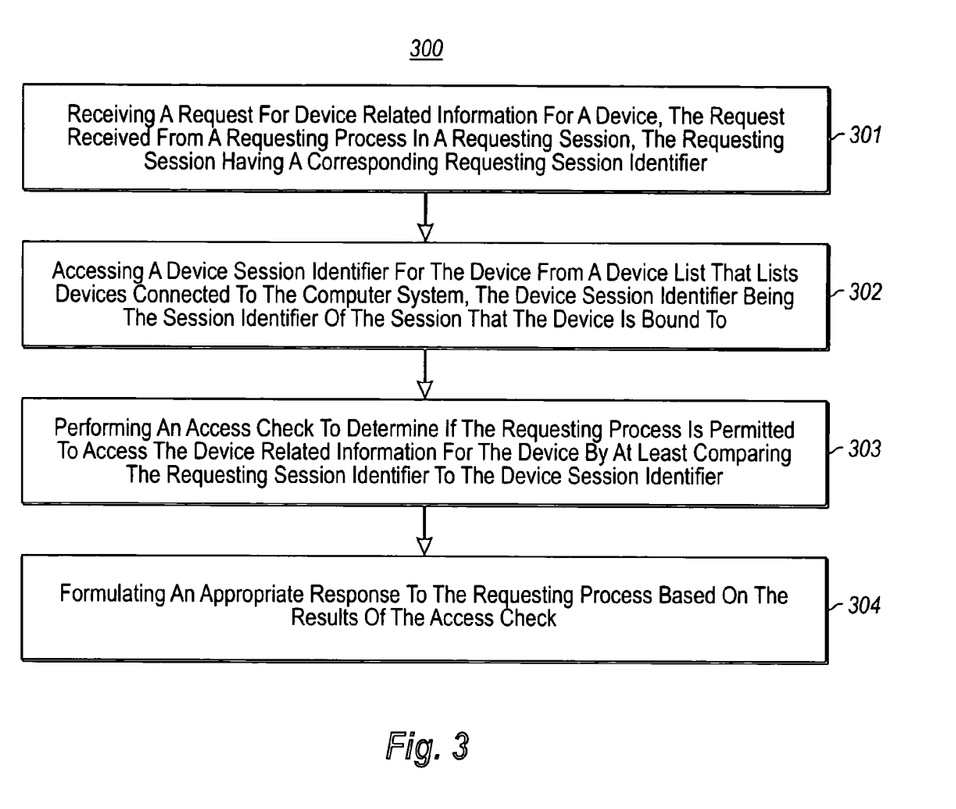
FIG. 3 illustrates a flow chart of an example method for restricting device access to a specified session.

FIG. 3 illustrates a flow chart of an example method 300 for restricting device access to a specified session. The method 300 will be described with respect to the components and data depicted in FIG. 1B.

Method 300 includes an act of receiving a request for device related information for a device (act 301). The request can be received from a requesting process in a requesting session wherein the requesting session has a corresponding (potentially unique) session identifier. For example, terminal server 113 can receive device enumeration request 151 (a request for device related information for all devices) from terminal server layer 112 over session 144. Enumeration request 151 can originate at an application of client 102, be passed down to process 129 (e.g., a client side component), and then be passed down to terminal server layer 112 for transfer. When device enumeration request is sent over session 144, device enumeration request 151 corresponds to session ID 146.

In some environments, client processes register for event notifications. For example, process 119 may register for event notifications for devices 121 and 122. Registration for event notifications can be included as part of redirecting a device. For example, (referring briefly back to FIG. 1A), redirection request 141 can include a registration request to register for events related to device 121. On the other hand, registration for event notifications can be sent separately, for example, at some relevant time after device redirection. For example, (referring again to FIG. 1B) terminal server layer 111 can send event registration request 179 over session 134 to attempt to register for event notifications for device 121 (subsequent to the redirection of device 121). Thus, a request to register for event notifications for a device can be viewed as a request for device related information.

It may also be that some event related to a device is detected, such as, for example, completion of a file or message synchronization. For example, terminal server layer 113 can detect event 177 related to device 122. In response to a detected event, terminal server layer 113 may be configured to send device related information for a device to appropriate sessions. For example, in response to detected event 177 terminal server layer 113 may be configured to notify process 119. According, detection of an event can also be viewed as a request for device related information for a device.

For virtually any type of request, session filter 162 can retain the session identifier for the session that sent the request for device related information.

Method 300 includes an act of accessing a device session identifier for the device from a device list that lists devices connected to the computer system (act 302). The device session identifier is the (potentially unique) session identifier of the session that the device is bound to (redirected and/or connected the device to terminal server 103). For example, in response to device enumeration request 151, event registration request 179, or event 177, terminal server layer 113 can access session identifiers for one or more devices from device list 138.

In response to a device enumeration request, session filter 162 can access session identifiers for all devices in device list 138. For example, in response to device enumeration request 151, session filter 162 can access session IDs at least for devices 122, 121, 172, 104, and 106 from device list 138. In response to a request to register for event notifications, session filter 162 can access session identifiers for any devices identified in the registration request. For example, in response to event registration request 179, session filter 162 can access a session ID for device 121 from device list 138. In response to a detected event, session filter 162 can access session identifiers for any devices associated with the event. For example, in response to event 177, session filter 162 can access a session ID for device 122 from device list 138.

Method 300 includes an act of performing an access check to determine if the requesting process is permitted to access the device related information for the device by at least comparing the requesting session identifier to the device session identifier (act 303). For example, session filter 162 can compare a retained session ID for a session that sent a request for device related information to one or more session IDs accessed from device list 138.

A session ID can be maintained as an inherent property on an operating system of terminal server 103. Thus, it may not be necessary for a requesting session to offer its session ID when making a request. In some embodiments, terminal server 103 refuses offered session IDs and relies on inherent session ID's. Reliance on inherent session IDs significantly reduces the possibility of a session spoofing (i.e., offering a session ID for a different session).

For enumeration request 151, session filter 162 can compare session ID 146 to the session ID included in each entry of device list 138. For event registration request 179, session filter 162 can compare session ID 136 to the session ID included in entry 121E. For event 177, session filter 162 can compare session ID 136 to the session ID included in entry 122E.

Method 300 includes an act of formulating an appropriate response to the requesting process based on the results of the access check (act 304). For example, terminal server layer 113 can formulate an appropriate response to any of device enumeration request 151, event registration request 179, and event 177. For device enumeration request 151, terminal server layer 113 can formulate a response that includes device related information for any device having a session ID that matches session ID 146.

For example, terminal server layer 113 can formulate the response to include entry 172E, as well as other data associated with or stored in device 172. Terminal server 113 can also formulate the response to omit device related information for any device having a session ID different than session ID 146. For example, terminal server layer 113 can formulate the response to omit device related information for devices 122, 121, 104, and 106, since these devices have different sessions IDs (and are thus associated with different sessions).

Accordingly, through the use of a session ID, device enumeration can be limited to devices in the same session with the process requesting the device enumeration. That is, a process can be allowed to enumerated devices in the same session but is prevented from enumerating devices in other sessions. For example, process 129 (in session 144) may be able to enumerate device 172 (in session 144). However, process 129 is prevented from enumerating devices 104 and 106 (in a local session) and devices 121 and 122 (in session 134).

In some embodiments, a system session (e.g., session 0) can enumerate and/or access devices in any session. In response to receiving an enumeration and/or access request from a process in a system session, terminal server 103 can skip, override, etc., any access checks. Alternately, terminal server 103 can be configured such that a system session matches all other established sessions. Thus, terminal server 103 can return a complete list of all entries in device list 138 in response to a request from a system session process.

For event registration request 179, terminal server layer 113 can formulate a response that registers a process for event notifications when the session ID associated with the request and the session ID of a device identified in the request match. For example, it may be that event registration request 179 is a request, sent over session 134, to register process 119 for event notifications for device 121. Thus, terminal server layer 113 can formulate a response that registers process 119 for event notifications for device 121 since the session ID in entry 121E (session ID 136) matches session ID associated with process 119 (session ID 136). On the other hand, it may be that that event registration request 179 is a request to register for event notifications for device 172 or device 104. Thus, terminal server layer 113 can formulate a response that does not implement event registration request 179 since the session ID in entry 172E (session ID 131) and 104E (session ID 146) do not match session ID 136.

Accordingly, through the use of a session ID, registration for event notifications can be limited to devices in the same session with the process requesting the registration. That is, a process can be allowed to register for event notifications for devices in the same session but is prevented from registering for event notifications for devices in other sessions. For example, process 119 (in session 134) may be able allowed to register for event notifications for devices 121 and 122. However, process 119 is prevented from registering for event notifications for devices 104 and 106 (in a local session) and device 172 (in session 144).

For event 177, terminal server layer 113 can formulate a response directed to the session that registered the device associated with event 177. For example, it may be that event 177 is a synchronization complete message associated with device 122. Thus, terminal server layer 113 can formulate a response, including notification 178, to notify process 119 of event 177. With or without a registered event notification, session filter 162 may compare a session ID associated with a detected event to entries in device list 138 to attempt to identify a match.

Thus, even if a process is able to inappropriately register for notifications for devices in another session, session filter 162 may still be able to prevent the process for receiving event notifications. For example, it may be that process 129 is some how (e.g., through the use of malicious code or undocumented mechanisms, such as, for example, direct parsing of a device section in an object repository)) able to register for events for device 122. However, when event 177 is detected for device 122, session filter 162 may still me able to determine that event 177 is associated with session 134 (and not associated with session 144) and prevent notification 178 from being sent to process 129.

Accordingly, through the use of a session ID, event notifications sent to a process can be limited event notifications for devices in the same session with the process. That is, a process can be permitted to receive event notifications for devices in the same session but is prevented from receiving event notifications for devices in other sessions (even if the process is some how able to register for event notifications for the other session). For example, process 119 (in session 134) may be permitted to receive event notifications for devices 121 and 122. However, process 119 is prevented from receive event notifications for devices 104 and 106 (in a local session) and device 172 (in session 144).

A formulated response containing the appropriate device related information can then be sent to the appropriate session. For example, entry 172E can be sent to client 102 in response to device enumeration request 151. Process 119 can be registered to receive event notifications for device 121 in response to event registration request 179. Client 101 can receive notification 178 in response to event 177.

Figure 4:
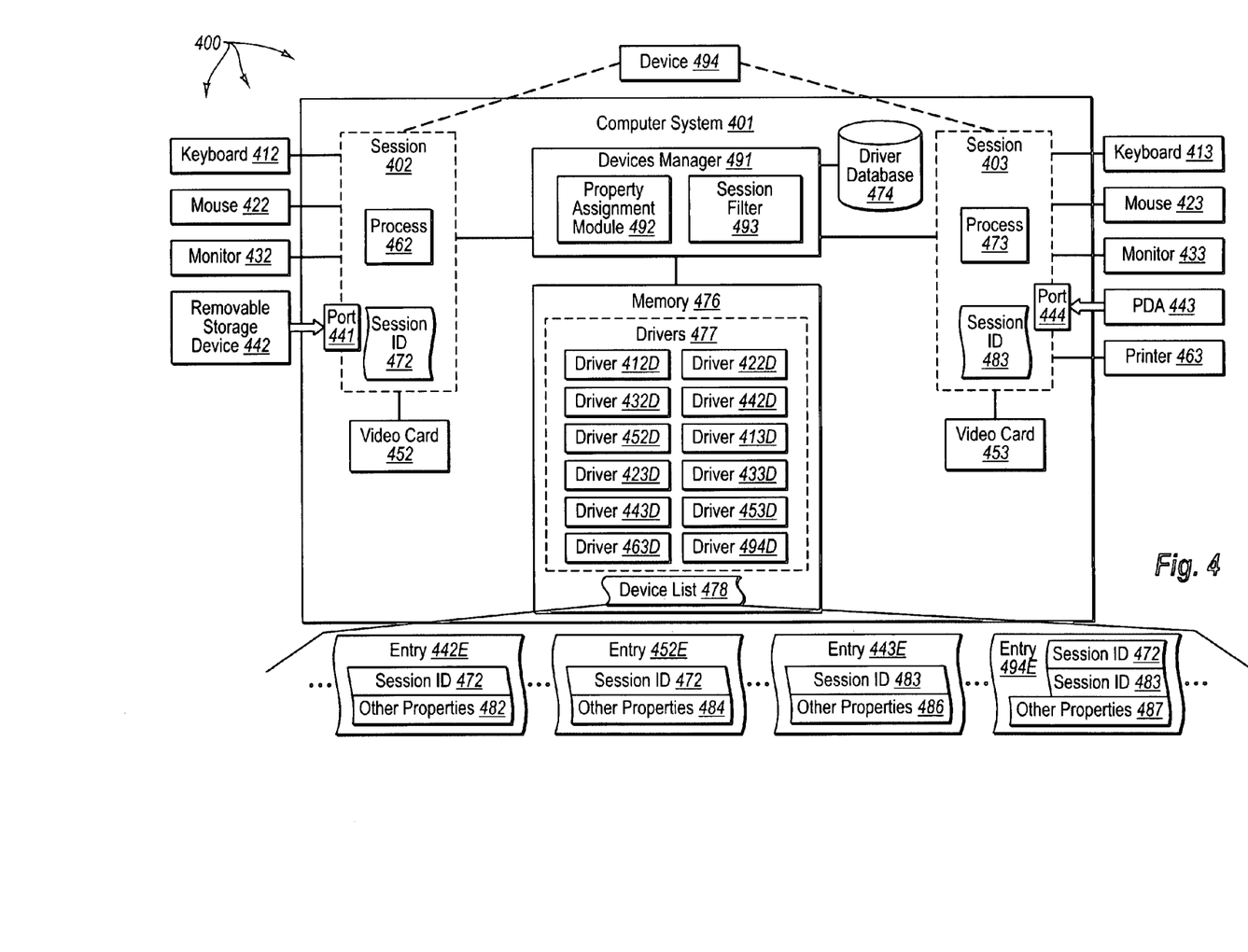
FIG. 4 illustrates a second example computer architecture that facilitates restricting device access per session.

Embodiments of the present invention can also be practiced in other environments. FIG. 4 illustrates a second example computer architecture 400 that facilitates restricting device access per session. As depicted, computer architecture 400 includes computer system 401 having a plurality of different resources and components. The different resources and components are allocated (logically and/or physically) between sessions 402 and 403. Each session at computer system 401 can be assigned a (potentially unique) session ID when the session is created. As depicted, session 402 is assigned session ID 472 and session 403 is assigned session ID 483. Session ID 472 and session ID 483 can be unique IDs used to distinguish session 402 and 403, as well as other sessions of computer system 401, from one another. Each session at computer system 401 can also have processes that use resources allocated the session as well as use shared resources of computer system 401.

When a process desires to initiate a session, the process can send an appropriate request to session establishment modules (e.g., part of an operating system) to request establishment of a session to access a portion of shared resources. For example, process 462 can send a session establishment request to operating system modules requesting a session to access resources of computer system 401. The session establishment modules can then establishing a session between the computer system and the process to allow the process to access the portion of shared resources. For example, operating system modules can establish session 402 for process 463 to permit process 462 to utilize keyboard 412, mouse 422, monitor 432, port 441, and video card 452.

Included as part of session establishment, the session establishment modules can assign a session identifier to the established session. The assigned session identifier differentiates the established session from other sessions of the computer system. For example, operating system modules can assign session ID 472 to session 402.

Similarly, process 473 can send a session establishment request to the operating system modules requesting a session to access resources of computer system 401. The operating system modules can establish session 402 for process 473 to permit process 473 to utilize keyboard 413, mouse 423, monitor 433, port 444, and video card 453, and printer 463. The operating system modules can assign can assign session ID 482 to session 403.

Operating system modules can also permit a plurality of sessions to utilize a device. For example, processes in session 402 and session 403 can be permitted to utilize device 494. Operating system modules can control the establishment and tearing down of bindings between a device and different sessions. Thus, a device can be bound to plurality of sessions (a 1-N relationship) in a controlled manner.

As devices configurations are detected for a session (e.g., during boot up of computer system 401 and when devices are subsequently added and removed), devices manager 491 manages drivers for interfacing with the devices. For example, when a new device is detected for a session, device manager can access driver database 474 to attempt to identify a driver for the device. When a driver is identified, the driver can be loaded into memory 476. When it is detected that a device is no longer associated with a session, the driver for the device can be unloaded from memory 476. Devices manager 491 can utilize automated mechanisms, such as, for example, Plug and Play ("PnP"), to assist computer system 401 in recognizing and adapting to hardware configuration changes.

Thus, drivers 477 can include appropriate drivers for any devices coupled to sessions 402 and 403. For example, as keyboard 412, mouse 422, monitor 432, and video card 452 are detected for session 402, corresponding drivers 412D, 422D, 432D, and 452D can be loaded respectively. Similarly, as keyboard 413, mouse 423, monitor 433, video card 453, and printer 463 are detected for session 403, corresponding drivers 413D, 423D, 433D, 453D, and 463D can be loaded respectively. When device 494 is detected for one session corresponding driver 494D can be loaded. Once loaded, other sessions bound to device 494 can also use driver 494D Devices manager 491 can also receive registration requests to register devices from processes at computer system 401 and can load appropriate software to permit computer system 401 to interface with the devices. For example, as additional devices are coupled allocated ports for a session, devices manager 491 can detect these additional devices and attempt to load appropriate drivers for interface with the devices. For example, when removable storage device 442 is couple to port 441, device manager and identify and load driver 442D to interface with removable storage device 442. Similarly, when PDA 443 is couple to port 444, device manager and identify and load driver 443D to interface with PDA 443.

When a device is detected, devices manager 491 can create a device entry for the device. The device entry can be configured to store values for properties of the device. Property assignment module 492 can record values for various device properties in a corresponding device entry for a detected device. The entry can then be stored in device list 478. In some embodiments, device list 478 has a hierarchical tree format as previously described.

In some embodiments, through reference to received device data and driver data, property assignment module 492 sets values for properties of a device entry. For example, property assignment module 492 can set values for each of other properties 482, 484, 486, and 487 (e.g., a device identifier value, a description value, a manufacturer name value, a section name value, a hardware identifier value, an installation result value) in entries 442E, 452E, 443E, and 493E respectively.

Property assignment module can also set session ID values in each entry. For example, a session ID value in entries 442E and 452E (corresponding to removable storage device 442 and monitor 443 respectively) can be set to session ID 472. Similarly, a session ID value in entry 443E (corresponding to removable storage device 443 and monitor 463 respectively) can be set to session ID 483. A session ID value for in entry 494E (corresponding to device 494) can be set to both session ID 472 and session ID 483. Accordingly, each entry in a device list 478 can include at least one session ID value and one or more other property values.

Subsequently, devices manger 491 can receive requests for device related information for devices from processes in various sessions. For example, devices manger 491 can receive device enumeration requests from processes at computer system 401. Session filter 493 can filter out devices that are not in the same session with a requesting process.

For example, devices manager 491 can receive a device enumeration request from process 462. Session filter 493 can determine that the device enumeration request originated from a process in session 462 and thus corresponds to session ID 472. Session filter 493 can scan each entry in device list 478 to identify devices having a session ID value that matches session ID 472. Entries having a matching session ID value (e.g., entry 442E, entry 452E, and entry 494E) can be returned to process 462. Entries not including session ID 472 (e.g., entry 443E) are not returned to process 462. Accordingly, process 462 is preventing from obtaining information about or stored at devices that are restricted to session 403.

Devices manager 491 can also receive requests to register for device event notifications form processes at computer system 401. For example, devices manger 491 can receive requests to register for device event notifications from process 473. When receiving a request for device event notifications, session filter 493 can compare the session ID value of the requesting process with any session IDs of the device the process is requesting to receive event notifications for. When session ID values match, session filter 493 can permit the registration. Other the other hand, when the session ID values do not match, session filter 493 prevents the registration. For example, session filter 493 can permit process 473 to register for event notifications for PDA 443 and device 494. On the other hand, session filter 493 prevents process 473 from registering for event notifications for removable storage device 442.

When a device event is detected, session filter 493 can identify any session ID values for the corresponding device. Session filter 493 can insure that a corresponding event notification is sent only to sessions the device is bound to (with potential exceptions for system sessions).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system having shared resources, the shared resources sharable among a plurality of sessions, the computer system connected to another computer system over a computer network, the other computer system having one or more devices connected as peripheral devices, a method for tagging a device connected to the other computer system to restrict access to the device, the method comprising:

an act of receiving a session establishment request from the other computer system, the session establishment request requesting establishment of a session between the computer system and the other computer system so that the other computer system can access a portion of the shared resources of the computer system;

an act of establishing a session between the computer system and the other computer system to allow the other computer system to access the portion of shared resources;

an act of assigning a session identifier to the established session, the session identifier differentiating the established session from other sessions of the computer system;

an act of receiving a device registration request from the other computer system, the device registration request being a request to register the device for use within the established session to interact with the shared resources;

an act of accessing appropriate software to permit the computer system to interface with the device in response to the registration request, wherein the act of accessing appropriate software to permit the computer system to interface with the device comprises an act of Plug and Play mechanisms at least partially automating the accessing of the appropriate software;

an act of creating a device entry for the device, the device entry including a session identifier property and other properties, the other properties configured to store device related values representing properties of the device;

an act of setting the value of the session identifier property in the device entry to the established session identifier such that access to the device related values can be restricted to processes in the established session; and an act of storing the device entry in a device list, the device list being accessible to a module that performs access checks based on session identifier properties to determine appropriate responses to requests for device related information.

2. The method as recited in claim 1, wherein the act of receiving a session establishment request from the other computer system comprises an act of receiving a request to establish an RDP session from a client.

3. The method as recited in claim 1, wherein the act of establishing a session between the computer system and the other computer system comprises an act of establishing an RDP session between a terminal server and client.

4. The method as recited in claim 1, wherein in the act of assigning a session identifier to the established session comprises an act of assigning an RDP session identifier to an RDP session during establishment of the RDP session.

5. The method as recited in claim 1, wherein the act of receiving a device registration request to register the device comprises an act of a terminal server receiving a request from a client to redirect a device from the client to the terminal server.

6. The method as recited in claim 1, wherein the act of receiving a device registration request to register the device comprises an act of detecting that the device is coupled to a port allocated to the session.

7. The method as recited in claim 1, wherein the act of accessing appropriate software to permit the computer system to interface with the device comprises an act of loading a device driver.

8. The method as recited in claim 1, wherein the act of creating a device entry for the device comprises an act of creating a device node for inclusion in a hierarchical device tree.

9. The method as recited in claim 1, wherein the act of setting the value of a session identifier property in the device entry comprises an act of assigning the value of the session identifier property to the session ID value of an established RDP session.

10. The method as recited in claim 1, wherein the act of storing the device entry in a device list comprises an act of storing a device node in a hierarchical device tree.

11. A computer program product for use at a computer system having shared resources, the shared resources sharable among a plurality of sessions, the computer system connected to another computer system over a computer network, the other computer system having one or more devices connected as peripheral devices, the computer program product for implementing a method for tagging a device connected to the other computer system to indicate that the device corresponds to a specified session, the computer program product comprising one or more computer storage media having stored thereon computer-executable instructions that, when executed at a processor, cause the computer system to perform the method, including the following:

receive a session establishment request from the other computer system, the session establishment request requesting establishment of a session between the computer system and the other computer system so that the other computer system can access a portion of the shared resources;

establish a session between the computer system and the other computer system to allow the other computer system to access the portion of shared resources;

assign a session identifier to the established session, the session identifier differentiating the established session from other sessions of the computer system;

receive a device registration request from the other computer system, the device registration request being a request to register the device for use within the established session;

access appropriate software to permit the computer system to interface with the device in response to the registration request by utilizing Plug and Play mechanisms to at least partially automate the accessing of the appropriate software;

create a device entry for the device, the device entry configured to store values for properties of the device;

set the value of a session identifier property in the device entry to the session identifier for the established session such that the subsequent transfer of device related information for the device can be restricted to processes in the established session; and  store the device entry in a device list accessible to a module that performs access checks to determine appropriate responses to requests for device related information.

12. The computer program product as recited in claim 11, wherein computer-executable instructions that, when executed, cause the computer system to receive a session establishment request from the other computer system comprise computer-executable instructions that, when executed, cause the computer system to receiving a request to establish an RDP session from a client.

13. The computer program product as recited in claim 11, wherein computer-executable instructions that, when executed, cause the computer system to establish a session between the computer system and the other computer system comprise computer-executable instructions that, when executed, cause the computer system to establish an RDP session between a terminal server and client.

14. The computer program product as recited in claim 11, wherein computer-executable instructions that, when executed, cause the computer system to assign a session identifier to the established session comprise computer-executable instructions that, when executed, cause the computer system to assign an RDP session identifier to an RDP session during establishment of the RDP session.

15. The computer program product as recited in claim 11, wherein computer-executable instructions that, when executed, cause the computer system to create a device entry for the device comprise computer-executable instructions that, when executed, cause the computer system to create a device node for inclusion in a hierarchical device tree.

16. The computer program product as recited in claim 11, wherein computer-executable instructions that, when executed, cause the computer system to set the value of a session identifier property in the device entry comprise wherein computer-executable instructions that, when executed, cause the computer system to assign the value of the session identifier property to the session JD value of an established RDP session.

17. The computer program product as recited in claim 11, wherein computer-executable instructions that, when executed, cause the computer system to store the device entry in a device list comprise computer-executable instructions that, when executed, cause the computer system to storing a device node in a hierarchical device tree.

\* \* \* \* \*

UNITED STATES PATENT AND TRADEMARK OFFICE
CERTIFICATE OF CORRECTION

| | |
|---|---|
| PATENT NO. | : 7,600,024 B2 |
| APPLICATION NO. | : 11/396191 |
| DATED | : October 6, 2009 |
| INVENTOR(S) | : Santosh Sharad Jodh et al. |

It is certified that error appears in the above-identified patent and that said Letters Patent is hereby corrected as shown below:

In column 18, line 32, in Claim 16, delete "JD" and insert -- ID --, therefor.

Signed and Sealed this
Eighth Day of February, 2011

David J. Kappos
*Director of the United States Patent and Trademark Office*